United States Patent [19]
Berry et al.

[11] Patent Number: 5,973,697
[45] Date of Patent: Oct. 26, 1999

[54] METHOD AND SYSTEM FOR PROVIDING PREFERRED FACE VIEWS OF OBJECTS IN A THREE-DIMENSIONAL (3D) ENVIRONMENT IN A DISPLAY IN A COMPUTER SYSTEM

[75] Inventors: Richard Edmond Berry; Scott Harlan Isensee, both of Georgetown, Tex.; David John Roberts, Stockton, United Kingdom; Didier Daniel Bardon; John Martin Mullaly, both of Austin, Tex.

[73] Assignee: International Business Machines Corporation

[21] Appl. No.: 08/789,345

[22] Filed: Jan. 27, 1997

[51] Int. Cl.[6] ...................................................... G06T 17/00
[52] U.S. Cl. ........................... 345/418; 345/419; 345/429
[58] Field of Search .................................... 345/419, 420, 345/418, 429

[56] References Cited

U.S. PATENT DOCUMENTS 5,261,044  11/1993  Dev et al. .
5,276,785  1/1994  Mackinlay et al. .
5,751,931  5/1998  Cox et al. ................................ 345/440

OTHER PUBLICATIONS

Mackinlay, Jock D.; Card, Stuart K.; Robertson, George G.; "Rapid Controlled Movement Through a Virtual 3D Workspace", *Computer Graphics*, vol. 24, No. 4, Aug. 1990.

*Primary Examiner*—Phu K. Nguyen
*Assistant Examiner*—Cliff N. Vo
*Attorney, Agent, or Firm*—Sawyer & Associates; Volel Emile

[57] ABSTRACT

A system and method for utilizing face viewpoints of objects in a 3D environment includes three aspects. In a first aspect, the system and method is directed to defining a plurality of optimized viewpoints of an object referred to hereinafter as face viewpoints. In a second aspect a method and system is disclosed that provides for a preferred face viewpoint of the plurality of face viewpoints. Finally, the third aspect provides for a system and method for determining a navigation path to the preferred face viewpoint.

8 Claims, 5 Drawing Sheets

METHOD AND SYSTEM FOR PROVIDING
PREFERRED FACE VIEWS OF OBJECTS IN
A THREE-DIMENSIONAL (3D)
ENVIRONMENT IN A DISPLAY IN A
COMPUTER SYSTEM

CROSS-REFERENCE TO RELATED APPLICATIONS

The present application is related to application Ser. No. 08/789,343, filed on Jan. 27, 1997, entitled "A Method and System for Classifying User Objects in a Three-Dimensional (3D) Environment on a Display in a Computer System," application Ser. No. 08/789,341, filed on Jan. 27, 1997, entitled "A Method and System for Effectively Controlling an Object in a Three-Dimensional Environment in a Display of a Computer System," application Ser. No. 08/789,344, filed on Jan. 31, 1997, entitled "Method and System for Navigating Through Opaque Structures on a Display," application Ser. No. 08/789,338, filed on Jan. 27, 1997, entitled "A Method and System for Providing Visual Hierarchy of Task Groups and Related Viewpoints of a Three-Dimensional Environment in a Display of a Computer System," and application Ser. No. 08/789,342, filed on Jan. 27, 1997, entitled "A Method and System for Providing an Improved view of an Object in a Three-Dimensional (3D) Environment on a Computer Display" filed on the same date as the present application and assigned to the assignee of the present application.

TECHNICAL FIELD

The present invention relates generally to organizing objects and navigating within a three-dimensional (3D) environment within a display in a computer and more particularly relates to viewpoints that facilitate user interaction with objects.

BACKGROUND

Presently in a computer environment the screen or display on the computer has a plurality of icons and windows thereon. In a typical environment including a window and a pointing device, to access certain information it is important to point to and then click on a particular icon or window. Oftentimes, this type of environment is not efficient unless the user has a specific understanding of the particular nomenclature and syntax of the particular environment of the computer. Hence, a user that is not familiar with that syntax or nomenclature could become easily confused and spend a significant amount of time trying to understand how to navigate and access certain information. This can cause user frustration as well as create considerable inefficiency in the system.

Three dimensional (3D) presentations are known, for example, to be utilized in computer games or virtual reality world environments in a computer system. User interaction with objects in 3D spaces, such as found in computer games and in virtual reality world environments using virtual reality modeling language (VRML) on the Internet, is made difficult by the perspective projection inherent in 3D presentation and because there is no easy way for users to move to a viewpoint that facilitates interactivity with an object of interest. In addition, a computer game is not an environment where useful work is accomplished, such in a business environment. Commonly understood user controls, such as buttons, sliders, and text entry fields cannot be easily used when viewed from an angle. Ease of use and productivity will be crucial aspects of making 3D user environments easy to use and productive.

For example, while navigating in the 3D world the user might find a calculator in the drawer of a desk. Using the calculator at the angle of view in effect when the user discovered it would not be practical due to the angles involved. Moving the viewpoint to be perpendicular to the desk drawer would also not be practical as the user might have to move "into" the drawer to be close enough to see an appropriate level of detail on the calculator. Perpendicular viewing has the additional disadvantage of being disorienting and does not facilitate the gathering and use of multiple objects at the same time in the performance of a single task.

What is needed is a system and method for enhancing the use of certain aspects of a 3-D environment where useful work is done on a computer display, without creating undue complexity. The system should be easy to implement and compatible with existing computer systems. The present invention addresses such a need.

SUMMARY

A system and method for utilizing face viewpoints of objects in a 3D environment includes three aspects. In a first aspect, the present invention is to defining a plurality of optimized viewpoints of an object referred to hereinafter as face viewpoints. In a second aspect a method and system is disclosed that provides for a preferred face viewpoint of the plurality of face viewpoints. Finally, the third aspect provides for a system and method for determining a navigation path to the preferred face viewpoint.

DETAILED DESCRIPTION

The present invention relates to organizing and navigating within a three-dimensional (3D) environment within a display on a computer system. The following description is presented to enable one of ordinary skill in the art to make and use the illustrative embodiment and is provided in the context of a application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

Figure 1:
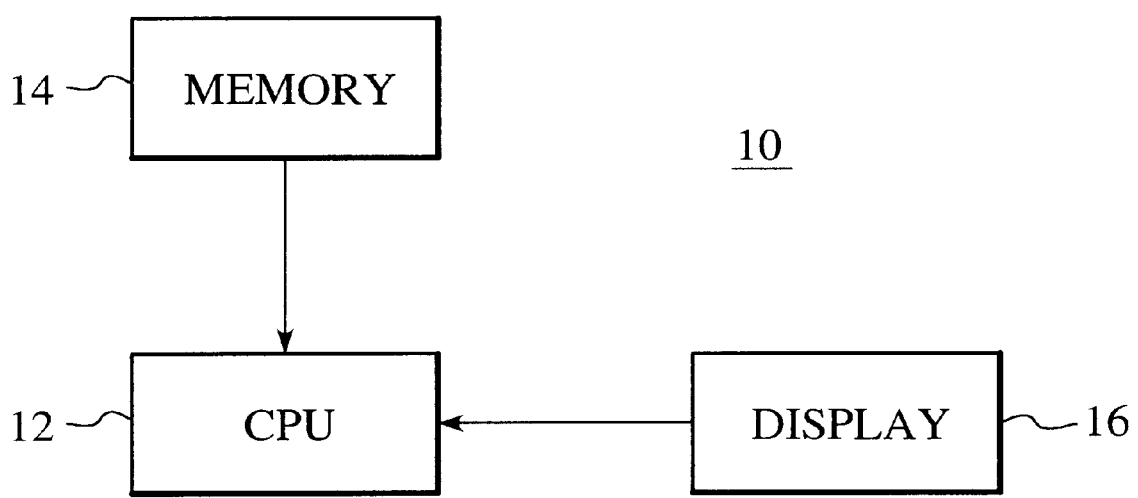
FIG. 1 is a block diagram of a computer system.
Figure 2:
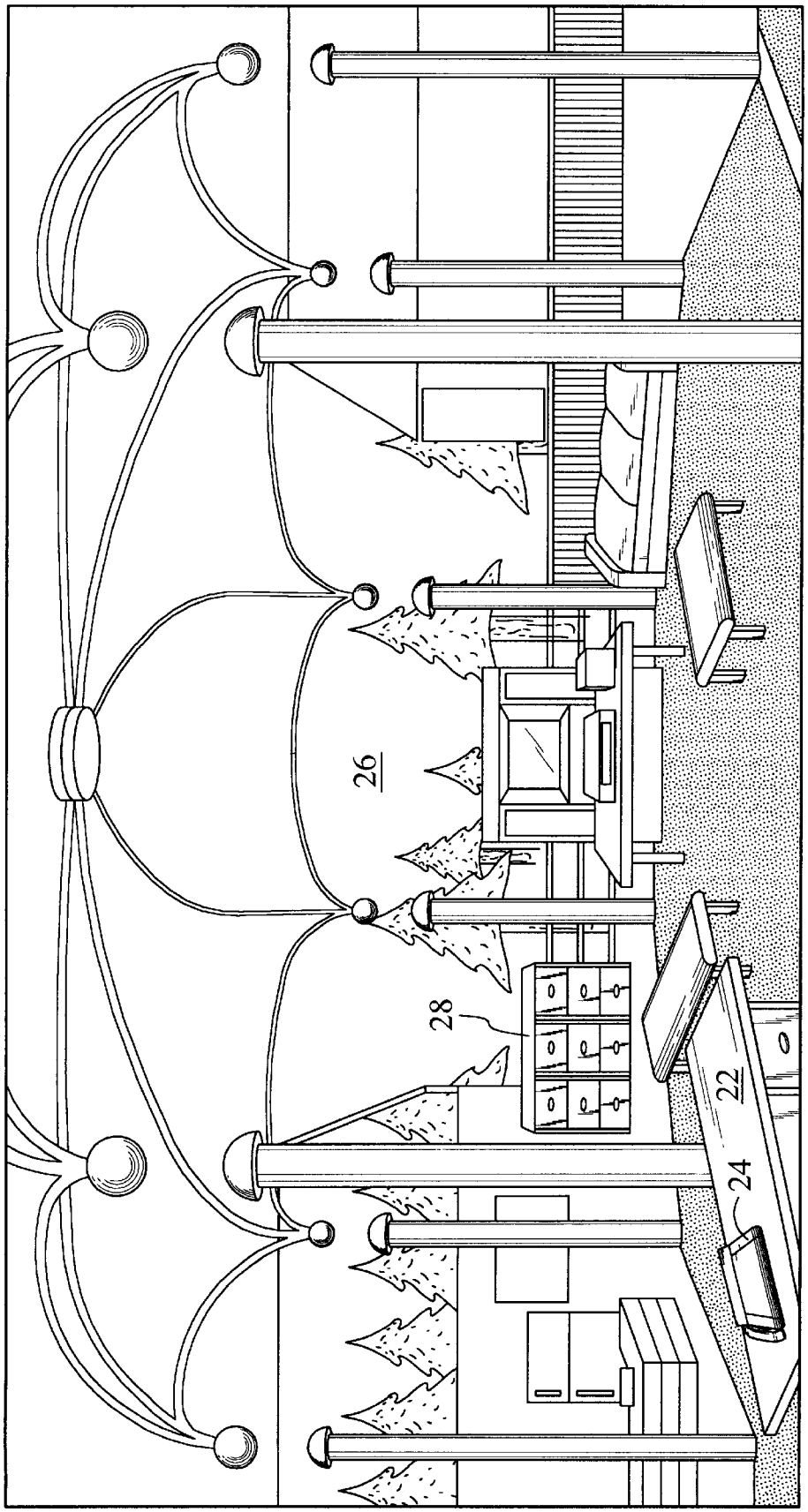
FIG. 2 is a three dimensional representation inside a home on a display of a computer system.

In the present invention, three dimensional ("3D") representations are utilized to show particular environments on a display 16 of a computer system 10 as shown in FIG. 1. For example, a home environment can be depicted on the display utilizing various 3D representations. Referring now to FIG. 2, what is shown is a 3D representation of a home 20 in which there is a desk 22, telephone 24, atrium 26, file cabinets 28, and other objects that make up the 3D representation. This 3D representation of certain of these objects can be containers for different information. For example, the desk 22 could include drawers, each of the drawers includes files, as in a typical office environment.

In a 3D environment in accordance with the present invention, a user viewpoint can navigate through the home in two ways. One way to navigate in the environment is for the user viewpoint to move through the home through the movement of the pointing (mouse, cursor or the like) device to simulate walking through the home. The other way to navigate in the environment is through providing certain events to facilitate user viewpoint movement from one point to another through the 3D environment.

Hence, to facilitate this second example, it is desirable to use these objects as containers in the appropriate fashion to provide the particular information. So, for example, using a pointing device such as a mouse or the like in a Windows environment, a desk could be pointed to and clicked on, the user viewpoint would then move closer to the desk, in a position where the drawers could be seen. A particular drawer could be clicked on and then opened, revealing a plurality of files. Thereafter, a particular file could be clicked on, and a representation of that file would be removed from the drawer and provided for access to the user viewpoint. Thereafter, the user could then click on the file and flip through the various documents in the file.

In another example, the telephone could be clicked on to bring the user viewpoint closer to the telephone. The user could then dial a number by using the keypad on the telephone to dial a particular number. In addition, there may be a fax facility on the telephone which could be used in which the computer system would then act as a fax machine. Accordingly, by using this 3D representation, using various objects in a 3D representation as containers rather than the typical Windows environment in which there are a plurality of windows and icons to be clicked on that may or may not be representative of the particular task that is to be performed, a system is provided in which it would be easier for a user to navigate and use in an expeditious and efficient manner.

This 3D representation allows for certain advantages while performing useful work. These advantages will be described below in conjunction with the accompanying figures.

A system and method for utilizing face viewpoints of objects in a 3D environment includes three aspects. In a first aspect, the present invention is directed to defining a plurality of optimized viewpoints of an object referred to hereinafter as face viewpoints. In a second aspect a method and system is disclosed that provides for a preferred face viewpoint of the plurality of face viewpoints. Finally, the third aspect provides for a system and method for determining a navigation path to the preferred face viewpoint.

Figure 3:
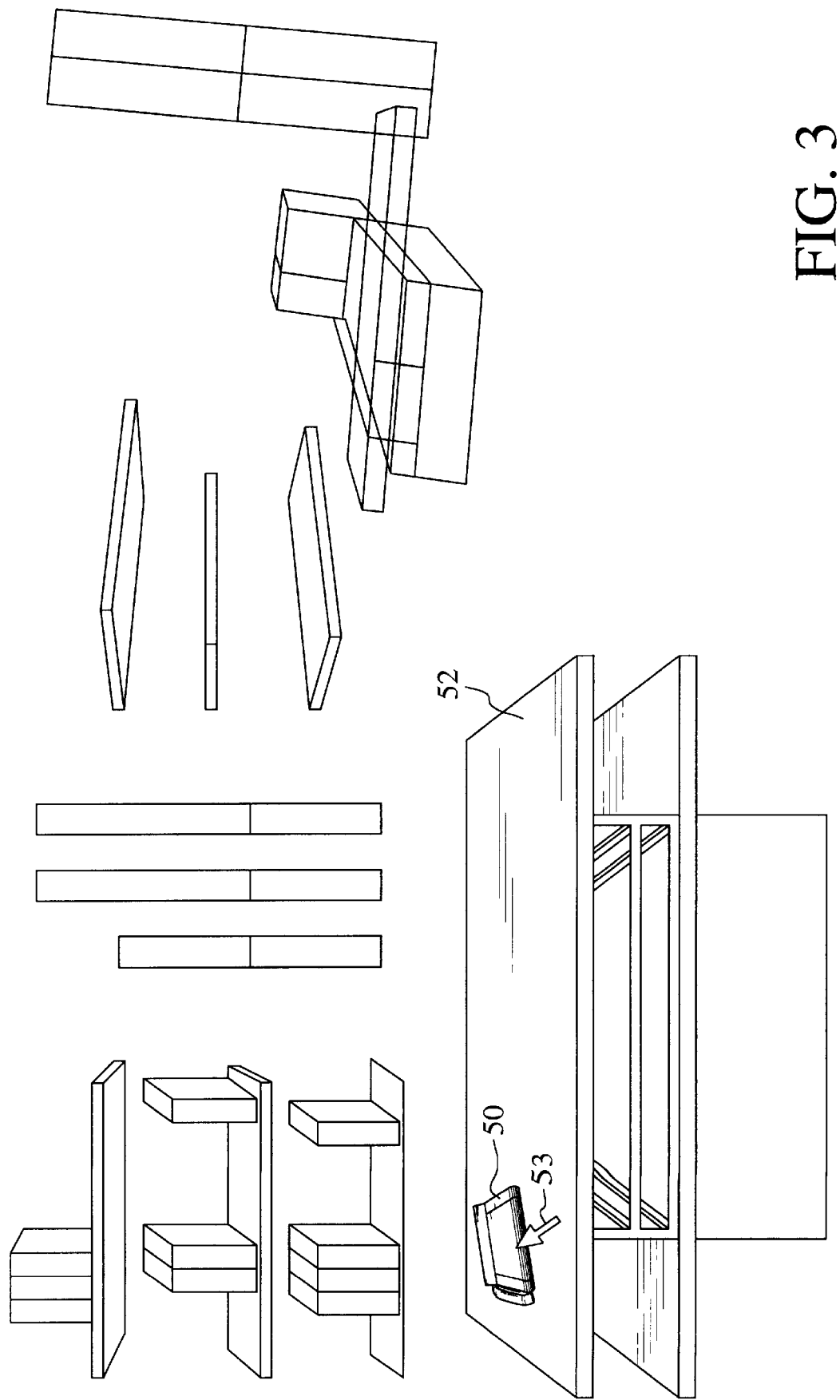
FIG. 3 illustrates a telephone on a desk in a 3D environment on a computer display.

FIG. 3 illustrates a telephone 50 on a desk 52 in a 3D environment on a computer display. To facilitate the use of the telephone 50, it is important to be able to define face viewpoints. These face viewpoints will allow for the telephone 50 to be utilized for various purposes such as calling an individual via the computer, utilizing a facsimile, or the like.

Figure 4:
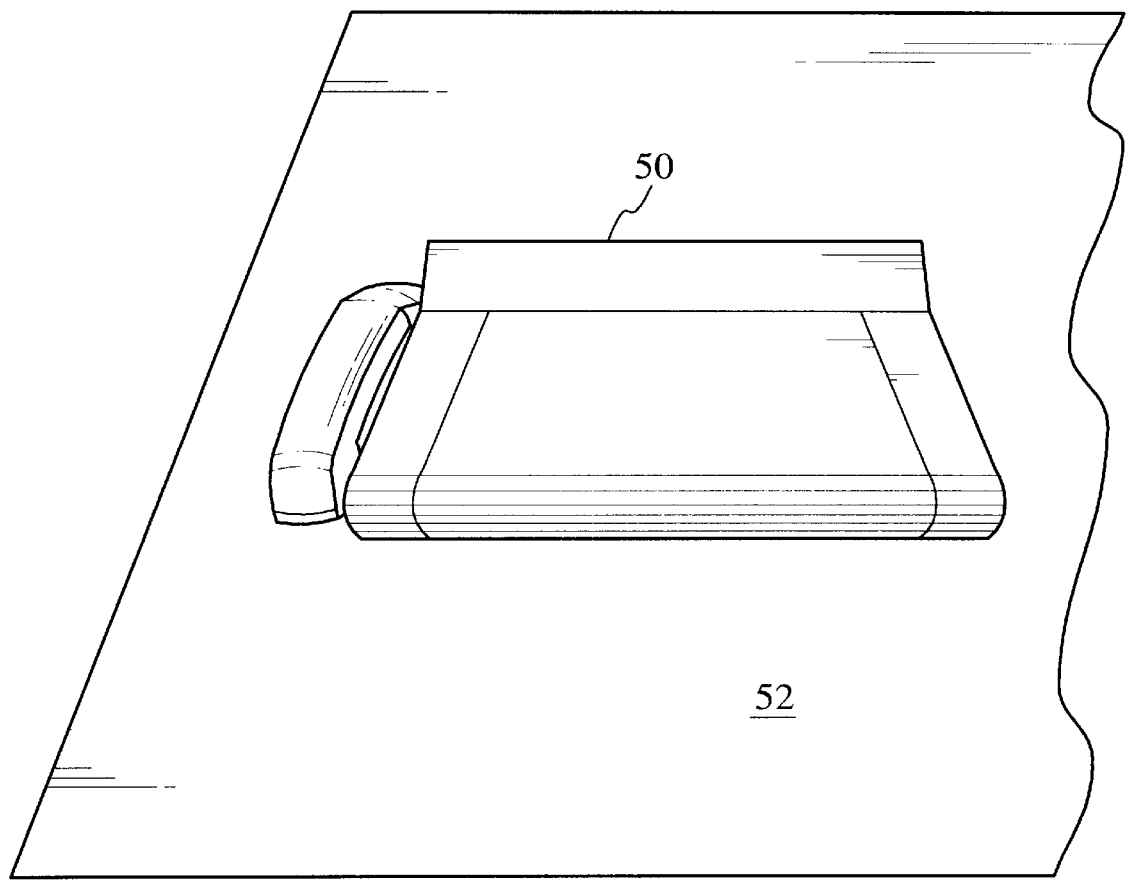
FIG. 4 illustrates the telephone of FIG. 3 after the user has clicked on the telephone for use.

FIG. 4 illustrates the telephone 50 of FIG. 3 after the user has clicked on the telephone 50 for use. In this embodiment, the telephone 50 is closer to the user allowing the user to use more functions on the telephone 50. To facilitate this use, it is important that a plurality of face viewpoints are defined for each object and it is also important that a preferred face viewpoint be provided for each object.

The following sections will describe with particularity the above-identified features associated with utilizing face viewpoints associated with objects in a 3D environment displayed on a computer system.

Defining a Plurality of Face Viewpoints of an Object

In a preferred embodiment, a plurality of such viewpoints are provided by the designer of the object. Also in a preferred embodiment, each viewpoint is in a fixed relationship with the object such that when the object is moved its viewpoints are moved with it.

In a preferred embodiment, Next Face Viewpoint and Prior Face Viewpoint are defined. Specific interaction techniques using a variety of input devices are then specified for each abstract action. For example, using a keyboard, the Next Face Viewpoint action might be assigned to the PgDn key, with the Prior Face viewpoint action assigned to the PgUp key. In another example, using voice commands, the Next Face Viewpoint action might be assigned to the spoken phrase "next viewpoint", and so forth.

Nomination of a Preferred Viewpoint

In a preferred embodiment, an object designer may nominate one of said viewpoints to be the preferred viewpoint. Navigation techniques are then defined that move the user directly to the preferred viewpoint of an object of interest. For example, a click of the mouse button with the mouse pointer over an object of interest would navigate the user directly to the preferred viewpoint designated by the object designer.

This technique provides an efficient and productive navigation in a 3D environment. The preferred viewpoint is chosen by the object designer to expose the most useful object functions and facilitate user interaction. Furthermore, it preserves the optimum viewpoint of each object even as the objects are moved within the 3D environment.

When the designer of an object does not specify a preferred viewpoint some automatic mechanism should be provided to give the user the best possible viewpoint.

When picking an object of interest in such navigation schemes it is important that the user be moved to a useful view of the object. When several such candidate viewpoints exist an algorithm can be employed to pick the most useful viewpoint based on the user's current context.

Determining A Navigation Path to A Preferred Face Viewpoint

A navigation technique that allows users to navigate directly to the preferred viewpoint of an object using a variety of input devices, such as a mouse or keyboard is provided. Efficient navigation will be a crucial aspect of making 3D user environments easy to use and productive. When the user has focused into working with a particular object they must still have easy and efficient means navigate around the object to achieve the best view for the task at hand. The Next/Previous Face Viewpoint actions and associated techniques fill this need.

An algorithm based on the user's direction of approach to the object is used to select one of the object's face viewpoints. Various algorithms may be employed, each taking into account various aspects of the user's context and the task to be performed. For example, a simple algorithm might simply compare the angle of the user's approach to the object with the angle of each predefined viewpoint on the object and select the closest viewpoint.

Figure 5:
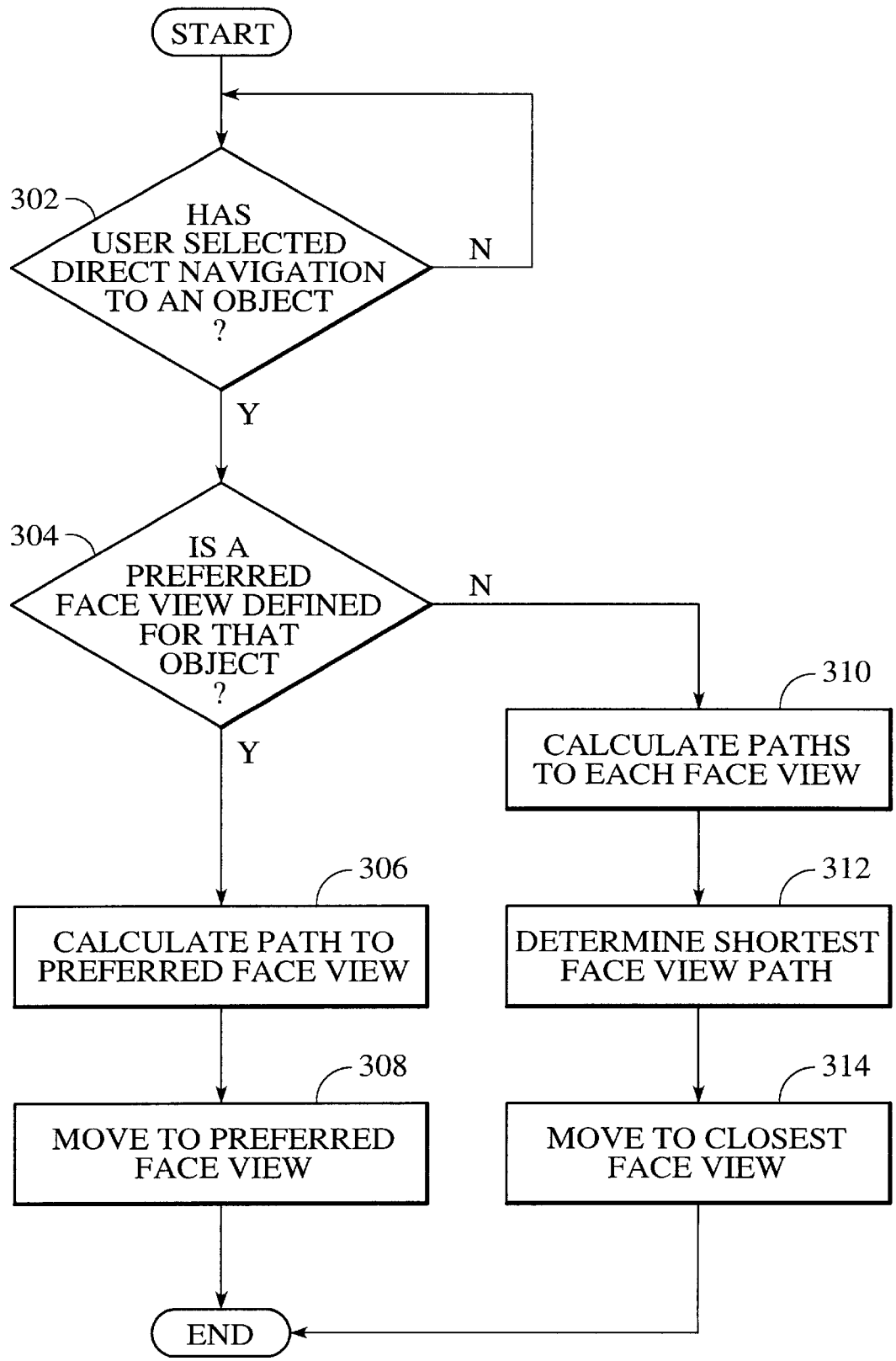
FIG. 5 is a flow chart of operation of a system in accordance with the present invention.

To further describe a system and method in accordance with the present invention that relates to the above-identified aspects, refer now to FIG. 5. FIG. 5 is a flow chart of operation of a system in accordance with the present invention. First, as is seen a determination is made as to whether a user has selected a direct navigation to an object, via step 302. If the answer is no, then return to the beginning. If the answer is yes, then next a determination is made whether a preferred face view is defined for that object, via step 304. If a preferred face view has been defined, then a path is calculated to the preferred face view, via step 306. Then, the user viewpoint moves to the preferred face view, via step 308. On the other hand, if the preferred face view has not been defined for that object, then a path is calculated to each face view that has been predefined, via step 310. Next a determination is made for the shortest face view path, via step 312. Finally, the user viewpoint is moved to the closest face view, via step 314.

Accordingly, through a method and system in accordance with the present invention, A plurality of optimized viewpoints are defined for an object referred to hereinafter as face viewpoints. Each of the viewpoints are associated with and move with the object. An aspect of a method and system provides for a preferred face viewpoint from a plurality of face viewpoints. This can be accomplished through a designer of the object defining the preferred face viewpoint or through an algorithm defining a preferred face viewpoint based upon the user context. Finally, the third aspect provides for a system and method for determining a navigation path to the preferred face viewpoint either automatically or through an algorithmic mechanism.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for providing an optimized face viewpoint of an object in a three-dimensional environment on a display in a computer system, the method comprising the steps of:

(a) providing a plurality of defined face viewpoints for an object, the face viewpoints being optimized viewpoints of the object;

(b) calculating a path to a preferred face viewpoint; and (c) moving a user viewpoint to the preferred face viewpoint.

2. The method of claim 1 in which the providing step (a) further comprises the steps of:

(a1) determining if the user has selected direct navigation to the object;

(a2) determining if a preferred face viewpoint is defined for the object if direct navigation is selected; and (a3) proceeding to step (b) if the preferred face viewpoint is defined for the object.

3. A method for providing an optimized face viewpoint of an object in a three dimensional environment on a display in a computer system, the method comprising the steps of:

(a) providing a plurality of defined face viewpoints for an object, the face viewpoints being optimized viewpoints for the object;

(b) calculating a path to each of a plurality of face viewpoints of the object;

(c) determining a path to the closest face viewpoint of the object; and (d) moving a user viewpoint to the closest face viewpoint of the object.

4. The method of claim 3 in which the providing step (a) further includes the steps of:

(a1) determining if the user has selected direct navigation to the object;

(a2) determining if a preferred face viewpoint is defined for the object if direct navigation is selected; and (a3) proceeding to step (b) if the preferred face viewpoint is not defined for the object.

5. A system for providing an optimized face viewpoint of an object in a three-dimensional environment on a display in a computer system, the system comprising:

means for providing a plurality of defined face viewpoints for an object the face viewpoints being optimized viewpoints of the object;

means for calculating a path to a preferred face viewpoint; and means for moving a user viewpoint to the preferred face viewpoint.

6. The system of claim 5 in which the providing means further comprises:

means for determining if the user has selected direct navigation to the object;

means for determining if a preferred face viewpoint is defined for the object if direct navigation is selected; and means for proceeding to calculate a path to the preferred face viewpoint if the preferred face viewpoint is defined for the object.

7. A system for providing an optimized face viewpoint of an object in a three dimensional environment on a display in a computer system, the system comprising:

means for providing a plurality of defined face viewpoints for an object the face viewpoints being optimized viewpoints of the object;

means for calculating a path to each of a plurality of face viewpoints of the object;

means for determining a path to the closest face viewpoint of the object; and means for moving a user viewpoint to the closest face viewpoint of the object.

8. The system of claim 7 in which the providing means further includes:

means for determining if the user has selected direct navigation to the object;

means for determining if a preferred face viewpoint is defined for the object if direct navigation is selected; and means for proceeding to calculate a path to the preferred face viewpoint if the preferred face viewpoint is not defined for the object.

* * * * *